Patented Dec. 25, 1928.

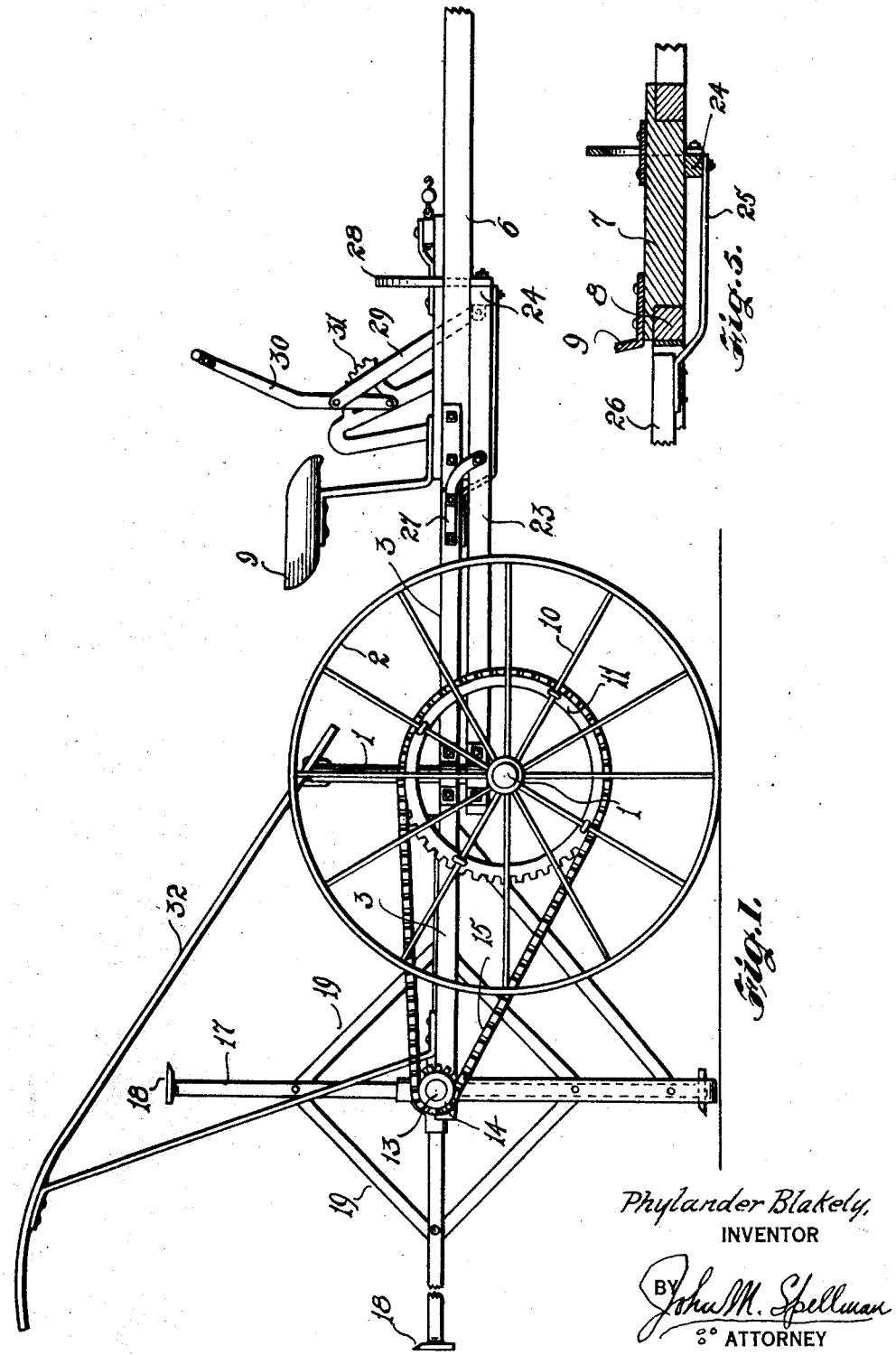

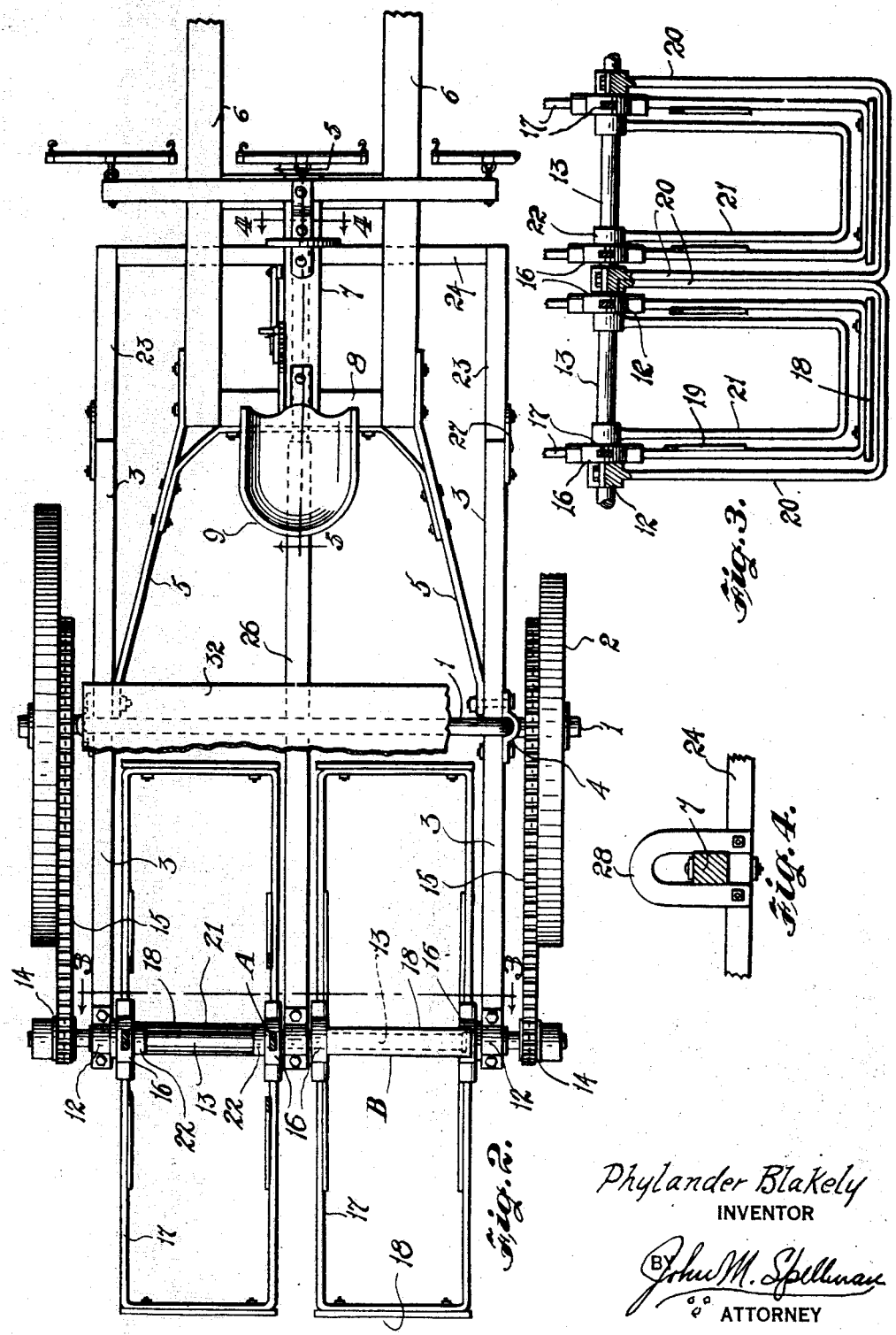

1,696,186

UNITED STATES PATENT OFFICE.

PHYLANDER BLAKELY, OF PLANO, TEXAS.

DOUBLE-ROW STALK CUTTER.

Application filed April 23, 1927. Serial No. 186,036.

This invention relates to improvements in stalk cutters, particularly for cotton stalks, although applicable to the cutting of corn stalks and the like, and in such connection it relates more particularly to the novel and unique construction of the parts thereof.

A particular object of the invention resides in providing a machine of this class which is adjustable from the driver's seat so that the cutting knives may be moved to desired heights from the ground in the cutting of the stalks.

Another particular object lies in the means employed for cutting and breaking the stalks in short lengths so as to permit the stalk residue to be utilized as a soil improver.

The invention will be clearly understood from a perusal of the following detailed description, taken in connection with the accompanying drawings and wherein:

Figure 1 is a side elevational view of the machine.

Figure 2 is a top plan view thereof.

Figures 3, 4 and 5 are detail sectional views on respective similar lines of Figure 2.

Proceeding in accordance with the drawings and wherein similar references designate the various parts of the invention, 1 denotes the axle of the machine, the axle being of the arched type and supported upon the wheels 2. An upper frame is provided for carrying the stalk cutting parts, the frame consisting of the bars 3 attached to the axle by the members 4. As clearly shown in Figure 2 these bars are pivotally connected by means of the rods 5 and pivot bolts 5ª to the draft bars 6, which includes the tongue 7, the tongue and draft bars being connected by a cross bar 8. A seat 9 is located on the tongue. Upon the spokes 10 of the wheels are mounted a ring gear 11, one for each wheel.

Mounted upon the rear ends of the bars 3 by the bearings 12 is a shaft 13, which carries on each end a small gear 14, and connecting the ring gear 11 and the gear 14 is a chain 15. The ratio of the ring gear 11 and the gear 14 is such that the shaft is caused to rotate very rapidly in the cutting of the stalks.

Upon the shaft 13 are mounted a plurality of hubs 16 and from these hubs extend the radial arms 17. Upon the arms 17 are mounted the cutting knives 18. The arms are properly braced by the pieces 19.

By reference to Figure 3 it will be seen that the shaft 13 is continuous and rests upon the bearings, and in Figure 3 it will also be observed that the outside bearings and the central bearing are formed integrally with the loop members 20. Arranged within the loop members 20 are smaller loop members 21 which are provided with the sleeves 22 and encircle the shaft 13. The purpose of these loop members will be further explained hereinafter.

Beneath the bars 3 are bars 23, the latter comprising a lower framework, the rear ends of the bars 23 being connected to the axle 1, underneath the bars 3. The forward ends of the bars 23 are connected by a cross-piece 24, and connected to the cross-piece 24 by a link 25 is a central bar 26. The rear end of the bar 26 is also connected to shaft 13 by means of the central bearing 12'.

The lower framework, consisting of the bars 23, cross-piece 24, and central bar 26, are connected to the upper frame work by the curved elements 27. Connected to the cross-piece 24 and enclosing the tongue 7 is a U-shaped member 28 and connected to the cross-piece 24 is a link 29 which is pivoted to the operating lever 30 of a segment 31—the segment being mounted upon the tongue 7.

In Fig. 3 which is a rear view, the loop members 20 are shown rigidly secured to the bearings 12, but these members would not appear in Fig. 2 as Fig. 2 is a top plan view and these loop members are hanging downwardly and directly under the blades 18.

The loops 21 are not stationary. These members are secured to the sleeves 22 that encircle the shaft 13 and hang loosely thereon and are free to move or swing as the stalks strike them while being cut. These loops would also not show in Fig. 2 as they hang downwardly and directly under the shaft 13.

There is no difference in the showing of shaft 13 with respect to the two sets of knives in Fig. 2. In one set the top knife has been broken away through the arms to which it is secured. This has been done to show the sleeves 22 which were directly underneath. In the other set the top knife 18 is still in place and the shaft 13 is shown in dotted lines under it.

In operation of the machine, obviously upon its movement through the field the drive wheels will rotate through the chain 15 the shaft 13 carrying the knives. The knives will thus rotate within the loop members 20 and 21 and the stalks are cut and broken by the action of the knives in connection with the loop members. The manner of adjusting the cutting and breaking height of these knives is effected by operation of the lever 30. From the foregoing definition of the parts of the machine, it will be clear that on movement of the lever 30 downward, the lower framework will be tilted in this direction, resulting in the arched axle 1 being thrown out of the perpendicular. The draft bars 6 through the rods 5 pivot on the bolts 5ª allowing the draft bars to remain stationary while the frames 3 and 23 tilt with the axle, the latter tilting in the wheel hubs. The frames 3 and 23 are not connected to the draft bars 6 except through the bolts 5ª and the loop 28 which allow a pivotal movement. Since the lower framework includes the central bar 26 and this bar is attached to the shaft 13, the shaft carrying the knives and loop members will be caused to rise according to the extent of the downward movement of the front part of the framework, that is the cross piece 24. The extent of this movement is of course governed by the desired height of the knives, such attained height being held by the segment. The upper and lower framework, therefore, move in unison one with the other, and when the lever 30 is moved downward, both frames, upper and lower, are moved downward at their forward ends and upward at their rear ends, the pivot point being in the axle hubs, the axle being thus thrown out of the perpendicular toward the front of the machine. The bolts 5ª provide a pivot around which the upper and lower frames tilt in unison. The driver occupying the seat 9 is not disturbed nor injured by the flying parts of stalks on account of the shield 32 which is sufficient protection, being properly braced to the axle and to the bars 3. The machine will operate on two rows of crop.

The invention is not to be understood as limited to the specific construction here shown, but may be modified, such modifications, changes and alterations to come within the scope and meaning of the appended claims.

What is claimed is:

1. A stalk cutting machine of the character described, comprising an upper framework and a lower framework mounted upon wheels and moving in unison with each other, the upper framework having a shaft mounted in bearings upon its rear end, inner and outer loop members supported by said shaft and bearings respectively, a plurality of knives mounted on said shaft and so arranged as to revolve between said loop members for cutting and breaking stalks, a draft frame pivotally connected with the upper framework, a yoke member carried by said lower framework and arranged to straddle said draft frame, permitting both upper and lower framework to pivot in unison and independently of the draft frame on the axle of the machine, the hubs of the wheels being the pivotal points, for the purpose of raising or lowering said knives and loop members, substantially as described.

2. A stalk cutting machine of the character described, comprising an upper and lower framework mounted upon wheels and free to pivot in the hubs of said wheels; a shaft carried on the rear of the upper framework carrying a plurality of cutting knives and loop members for breaking and cutting stalks, said upper framework being connected to and moving in unison with the lower framework, and means for raising and lowering the front end of the lower framework and thereby raising and lowering the rear end of the upper framework, resulting in the raising and lowering of the knives and loop members mounted thereon, substantially as described.

3. A stalk cutting machine of the character described, for operation on two rows of cotton, or the like, said machine comprising an upper and lower framework mounted upon wheels and including an arched axle, supported by, and pivoting in, the hubs of said wheels, a shaft carried on said upper framework cutting and breaking knives and loop members, mounted on said shaft, driving means between said shaft and wheels, and means for moving said lower framework upwardly and downwardly to move said arched axle from a perpendicular position when adjusting the cutting height of the knives and loop members, substantially as described.

4. A stalk cutting machine of the character described and set forth in claim 3, a draft frame pivotally connected with said upper framework and a lever on the draft frame and connected to the lower framework by a connecting element on the forward part of the machine.

In testimony whereof I affix my signature.

PHYLANDER BLAKELY.